United States Patent [19]

Martens et al.

[11] Patent Number: 5,004,912
[45] Date of Patent: Apr. 2, 1991

[54] FIBER-OPTICAL PRESSURE SENSOR WITH CONTACTING LIGHTWAVE CONDUCTORS

[75] Inventors: Gerhard Martens, Henstedt-Ulzburg; Jürgen Kordts, Norderstedt; Georg Weidinger, Hamburg, all of Fed. Rep. of Germany

[73] Assignee: U.S. Philips Corp., New York, N.Y.

[21] Appl. No.: 410,695

[22] Filed: Sep. 21, 1989

[30] Foreign Application Priority Data

Sep. 24, 1988 [DE] Fed. Rep. of Germany ....... 3832569

[51] Int. Cl.$^5$ ................................................ H01J 5/16
[52] U.S. Cl. ............................... 250/227.14; 250/231.1
[58] Field of Search ............... 250/227, 231 R, 227.14, 250/227.16, 231.10; 73/705

[56] References Cited

U.S. PATENT DOCUMENTS

| | | | |
|---|---|---|---|
| 4,342,919 | 8/1982 | Brogardh | 250/577 |
| 4,591,709 | 5/1986 | Koechner et al. | 250/227 |
| 4,607,162 | 8/1986 | Sai | 250/227 |
| 4,634,858 | 1/1987 | Gerdt et al. | 73/705 |
| 4,775,216 | 10/1988 | Layton | 250/227 |

FOREIGN PATENT DOCUMENTS 3012328 10/1980 Fed. Rep. of Germany .
3415242 10/1985 Fed. Rep. of Germany .

Primary Examiner—David C. Nelms
Assistant Examiner—Que Tan Le
Attorney, Agent, or Firm—Ernestine C. Bartlett

[57] ABSTRACT

The invention relates to a fiber-optical sensor, comprising a light transmitter device (6) which couples transmitted light into at least one first ligthwave conductor (3,4) and also comprising a light receiver device (7) which receives light from the first lightwave conductor and at least one second lightwave conductor (4,3). The lightwave conductors (3,4) comprise adjacently situated portions (1) which can contact one another in a light-transferring manner at given areas and which are accommodated together in an envelope (5) at this area, a force or a pressure being applied to the lightwave conductor via said envelope. The light transmitter device (6) also couples a first transmitted light into the first lightwave conductor (3,4) and a second transmitted light into the second lightwave conductor (4,3).

10 Claims, 2 Drawing Sheets

FIBER-OPTICAL PRESSURE SENSOR WITH CONTACTING LIGHTWAVE CONDUCTORS

FIELD OF THE INVENTION

The invention relates to a fiber-optical sensor, comprising a light transmitter device which couples transmitter light into at least one first lightwave conductor, and also comprising a light receiver device which receives light from the first lightwave conductor and at least one second lightwave conductor, the lightwave conductors comprising adjacently situated portions between which light can be coupled.

BACKGROUND OF THE INVENTION

A fiber-optical sensor of this kind which comprises two lightwave conductors (or optical fiber) having two adjacently situated portions between which light can be coupled is known from DE-PS No. 34 15 242. In this patent specification a lightwave conductor consists of a light-conducting core and a cladding surrounding this core. A part of the cladding is removed from the adjacently situated portions of the lightwave conductors. When a liquid is present at this gap, a part of the light is transferred from one lightwave conductor to the other. Light is coupled into one lightwave conductor by a light transmitter device. The light coupled into the other lightwave conductor via the gap and the light remaining in the lightwave conductor are received and evaluated in a light receiver device. All interference (for example, attenuation) occurring between the light transmitter device and the gap is eliminated by forming the ratio of the two light components. Subject to the condition that the lightwave conductors are subject to the same effects between the gap and the light receiver device, the interference induced thereby is also eliminated. This condition, however, can only be rarely satisfied in reality. This fiber optical sensor is capable of measuring, for example temperatures of a temperature-sensitive liquid introduced into the gap. Moreover, pressure measurement is possible where the refractive index of the liquid changes as a function of the pressure. In that case an additional, pressure-resistant and complex device must be provided which introduces and keeps the liquid in the gap.

Furthermore, from DE-OS No. 30 12 328 which corresponds substantially to U.S. Pat. No. 4,342,919 issued Aug. 3, 1982 there is known a fiber-optical measuring device in which a lightwave conductor and a light-conductive or light-absorbing synthetic material are adjacently arranged. The light conductor comprises a light-conductive core from which the cladding has been removed. Under the influence of the hydrostatic pressure in a container filled with liquid, the synthetic material is pressed against the lightwave conductor over a given distance which corresponds to the level in the container. Thus, a given part of the light coupled into the lightwave conductor is coupled out to the synthetic material. Via an intermediate interference filter, the lightwave conductor is connected, using further lightwave conductors, to two sources (light transmitter device) of light of different wavelength and to a light receiver device. The light from the first light source is reflected by the interference filter and reaches, via a branch of the lightwave conductors, the light receiver device as a reference signal. The two light sources are alternately powered, the corresponding electrical signals being detected in synchronism therewith in order to obtain a measurement signal by the formation of a quotient in a divider circuit, the magnitude of said signal depending on how much light has been coupled out by pressing the synthetic material against the stationary lightwave conductor and how much light is conducted to the light receiver device, via the lightwave conductors, after reflection. In this measuring apparatus the attenuation effect of the lightwave conductors between the interference filter and the light transmitter device and the light receiver device is eliminated by formation of the quotient. Drift characteristics of the branches in the transmitter device and the receiver device, however, are not eliminated. Because a part of the light is coupled into the synthetic material, only a part of the transmitted light is used for evaluation of the measurement. This may lead to inaccurate measurement results notably in the case of high liquid levels, where a very large part of the light is coupled out.

SUMMARY OF THE INVENTION

Therefore, an object of the invention is to provide a fiber-optical sensor which eliminates all interference occurring between the light transmitter device and the light receiver device and influencing the two lightwave conductors to a different extent. Another object of the invention is the provision of such a fiber-optical sensor which has a simple construction.

In such a fiber-optical sensor, this object is achieved in that the light transmitter device couples a first transmitted light into the first lightwave conductor and a second transmitted light into the second lightwave conductor, the adjacently situated portions of the lightwave conductors being accommodated together in an envelope via which a pressure or a force acts on the lightwave conductors, portions of the lightwave conductors contacting one another in a light-transferring manner under the influence of said pressure or force.

In this fiber-optical sensor the degree of optical coupling between the lightwave conductors is varied in dependence on the applied pressure or force. The common contact surface between the lightwave conductors is then increased at the area of contact. The area of contact is the portion of the lightwave conductors which extends inside the envelope and in which the lightwave conductors can be contacted. The envelope with the lightwave conductors accommodated therein thus forms a coupling device. Thus, when a pressure or a force is applied, more light is transferred from one lightwave conductor to the other via the area of contact.

The light conductors are made of a light-conductive core of a round cross-section and a cladding provided thereon. The cladding has a refractive index which is lower than that of the core, so that the light is conducted only within the core.

In order to eliminate interference which acts on both lightwave conductors, a first transmitted light is coupled into the first lightwave conductor and a second transmitted light is coupled into the second lightwave conductor. Interference, for example attenuation effects, can be eliminated by forming a ratio of the received light components. The measurement signal thus obtained depends on the load of the fiber-optical sensor, but is dependent neither on the optical constants of the lightwave conductors nor on the relevant wavelength of the transmitted light. The light transmitter device and the light conductors, therefore, need not be matched or adapted to one another with respect to the wavelength. As a result, the light transmitter device, the lightwave conductors and the coupling device can be readily exchanged.

On the one hand, the first and the second transmitted light can be coupled into the first and the second lightwave conductor alternately in time by the light transmitter device. On the other hand, the light transmitter device can simultaneously couple in the first and the second transmitted light when the intensity of the first transmitted light is amplitude modulated with a first modulation signal having a first frequency and the intensity of the second transmitted light is amplitude modulated with a second modulation signal having a second frequency. The light transmitter device can thus operate in time multiplex or frequency multiplex.

The fiber-optical sensor may also be of the transmission type or the reflection type. When the sensor is of the transmission type, the transmitter device is connected to one end of the relevant lightwave conductor, the light receiver device being connected to the other end. When the sensor is of the reflection type, one end of the relevant lightwave conductor is arranged in the envelope. The other end of the lightwave conductor is then connected to the light transmitter device and the light receiver device via couplers.

The fiber-optical sensor must comprise at least two lightwave conductors which are capable of transferring transmitted light at their area of contact. The envelope may also accommodate further lightwave conductors which also comprise a light-transferring contact area. Such further lightwave conductors can serve for mechanical stabilization of the lightwave conductors and as substitute lightwave conductors in the case of a fracture of the lightwave conductors carrying the transmitted light or the received light.

In a further embodiment of the invention, the two lightwave conductors accommodated in the envelope comprise a longitudinal ground portion at their area of contact. This results in a simple, mechanically more stable fiber-optical sensor. The cladding of the lightwave conductors in the envelope need not be completely removed; it must be removed merely at the area of contact.

In another embodiment of the invention, the lightwave conductors are arranged so as to extend in parallel at the area of contact. Preferably, the cladding should be removed only from the lightwave conductor in the envelope. The cores of the lightwave conductors contact one another. As the applied force increases, the cross-section of the cores is deformed and the area of contact between the two cores is increased.

In order to prevent sliding of the cores, as could occur in the latter device, the lightwave conductors may be stranded at the area of contact. The cladding has again been removed from cores of the lightwave conductors in the envelope.

The envelope serves to secure the lightwave conductors at the area of the fiber-optical sensor which takes up the force or the pressure. In a first embodiment such an envelope comprises two mutually parallel plates with grooves for the lightwave conductors. These grooves can be constructed as V-grooves in the center of the plates. Preferably, at least three grooves should be provided in order to achieve a high mechanical stability, i.e. one groove in one plate and two further grooves in the other plate. The three lightwave conductors are then arranged in the form of a pyramid. The third lightwave conductor also serves as a substitute should one of the two other lightwave conductors break. At the edges of the two plates which are made of, for example quartz glass, connection pieces made of quartz glass foil can be provided.

In a further embodiment of the envelope, the envelope consists of a capillary which is preferably made of quartz glass. The cores of the lightwave conductors from which the cladding has been removed are then guided through a quartz glass capillary. At one location the capillary is heated beyond the yield point and collapsed until its inner surface symmetrically encloses the cores at this area of the capillary. A load on the outer wall of the capillary then presses the lightwave conductor cores together, thus causing a load-dependent increase of the optical coupling therebetween. When the fiber-optical sensor is of a reflection type, the capillary does not comprise a through-hole but is closed at one end and a reflective layer is provided on the end faces of the lightwave conductors inside the capillary.

When the envelope and the lightwave conductors are made of a material having a different thermal expansion coefficient, such a fiber-optical sensor is suitable for temperature measurement. When the temperature changes, the pressures or forces between the envelope and the lightwave conductors also change. Thus, a force or a pressure acts directly from the envelope on the lightwave conductors.

In a fiber-optical sensor for pressure or force measurement the envelope and the lightwave conductors are made of a material having substantially the same thermal expansion coefficient. Via the envelope, a force or a pressure then acts additionally on the lightwave conductors.

In order to determine the physical quantity acting on the fiber-optical sensor, the light receiver device forms electrical signals for the intensity of the received light, the physical quantity being determined from said signals in an evaluation circuit by forming the ratio of the products $I_{11}I_{22}$ and $I_{21}I_{12}$ where $I_{11}$ is the intensity of the light component which originates from the first transmitted light and which remains in the first lightwave conductor, $I_{22}$ is the intensity of the light component which originates from the second transmitted light and which remains in the second light conductor, $I_{21}$ is the intensity of the light component which originates from the first transmitted light and which is coupled into the second lightwave conductor, and $I_{12}$ is the intensity of the light component which originates from the second transmitted light and which is coupled into the first lightwave conductor. The optical coupling between two lightwave conductors is determined by the ratio of the intensity of the received light in two lightwave conductors. The physical quantity can be determined, for example by way of the equation $$Q = (I_{11}I_{22})/(I_{21}I_{12})$$

where Q is a measure of the physical quantity. Therein, the optical coupling degree K is given by the square root of the value Q.

In a further embodiment, the lightwave conductors are constructed as integrated optical layers or stripwave conductors at least at their area of contact.

BRIEF DESCRIPTION OF THE DRAWING

Embodiments in accordance with the invention will be described in detail hereinafter with reference to the drawings wherein.

DETAILED DESCRIPTION OF PREFERRED EMBODIMENTS

Figure 1:
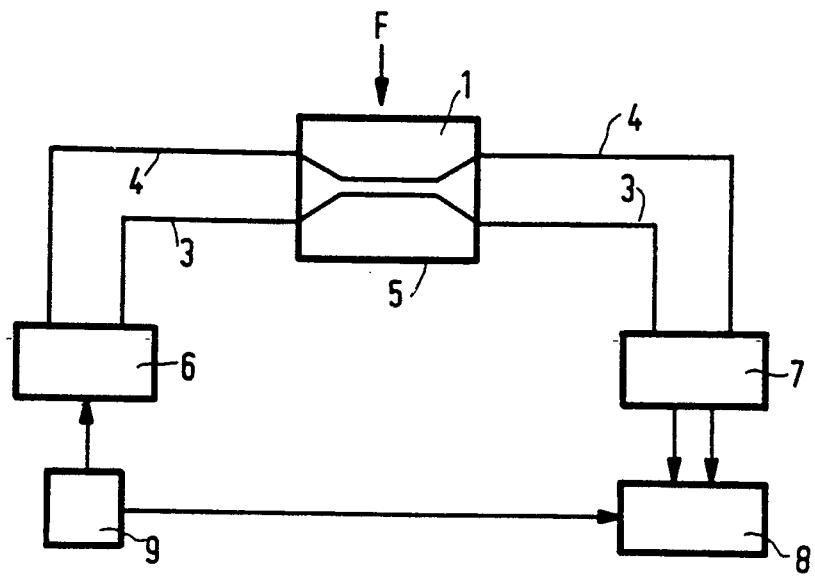
FIG. 1 is a simplified representation of a fiber-optical sensor.

FIG. 1 is a simplified representation of a fiber-optical sensor comprising a coupling device 1 whereby, for example a pressure, a force or a temperature can be measured. The coupling device 1 accommodates adjacently situated portions of two lightwave conductors 3 and 4 (optical fibers) which comprise a contact area where light can be coupled from one light conductor to the other by contact. The coupling device 1 also comprises an envelope 5 in which the lightwave conductors 3 and 4 are secured. When a force or a pressure is applied, the lightwave conductors 3 and 4 contact one another at their area of contact; alternatively the lightwave conductors 3 and 4 contact one another prior to the application of the force or the pressure at their area of contact, and the contact area is increased when the force or the pressure is applied. The lightwave conductors 3 and 4 are both connected to a light transmitter device 6 and a light receiver device 7. The light transmitter device 6 transmits a first transmitted light via the first lightwave conductor 3 and a second transmitted light via the second lightwave conductor 4, a given part thereof being coupled into the second lightwave conductor 4 and the first lightwave conductor 3 in the coupling device 1. The light component which remains in the first lightwave conductor 3 and the second lightwave conductor 4 and the light component which is coupled into the second lightwave conductor 4 and the first lightwave conductor 3 are applied to the light receiver device 7 in which they are converted into electrical signals which are applied to an electrical evaluation circuit 8.

The light transmitter device 6 can couple the first and the second transmitted light into the first and the second lightwave conductor alternately in time (time multiplex) or produce a first and a second transmitted light whose intensities are amplitude modulated by means of two modulation signals of different frequency, both transmitted lights being simultaneously coupled into the lightwave conductors 3 and 4 (frequency multiplex). When the first and the second transmitted light are coupled into the lightwave conductors 3 and 4 in an alternating fashion in time, synchronization is provided by a clock circuit 9 in order to enable identification of the first and the second transmitted light. For example, when the first transmitted light is transmitted a positive pulse is applied to the light transmitter device 6 and the evaluation circuit 8, a negative pulse being applied when the second transmitted light is transmitted.

In the evaluation circuit 8 a measure Q for the physical quantity to be determined is derived from the electrical signals. The electrical signals, being proportional to the light intensity of the received light, are calculated in accordance with the equation:

$$Q = (I_{11} I_{22})/(I_{21} I_{12})$$

Therein, $I_{11}$ is the intensity of the light component originating from the first transmitted light and remaining in the first lightwave conductor, $I_{22}$ is the intensity of the light component originating from the second transmitted light and remaining in the second lightwave conductor, $I_{21}$ is the intensity of the light component originating from the first transmitted light and coupled into the second lightwave conductor, and $I_{12}$ is the intensity of the light component originating from the second transmitted light and coupled into the first lightwave conductor. The measure Q for the physical quantity is independent of the attenuation losses in the two lightwave conductors 3 and 4 and represents the coupling between the lightwave conductors 3 and 4 in the coupling device 1. The coupling K is dependent on the value of the physical measurement quantity. The relationship between the derived measure Q of the physical quantity and the coupling K is given by the equation $Q = K^2$.

Figure 2A:
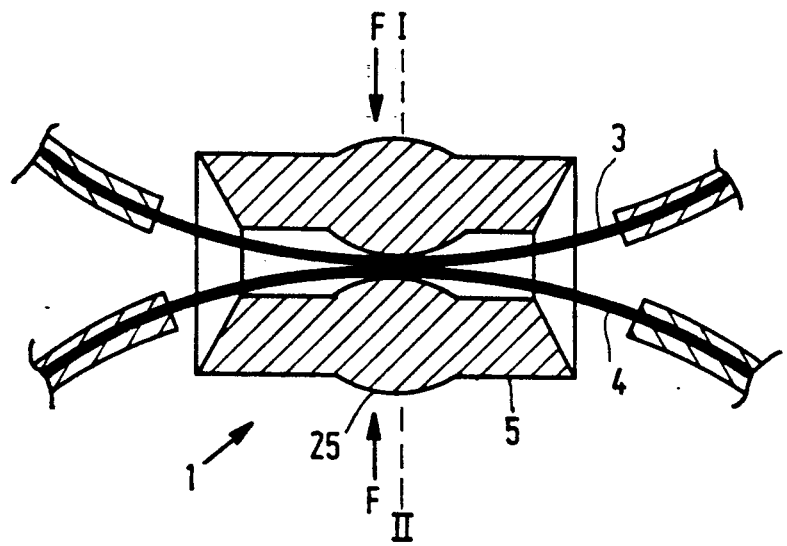
FIG. 2 shows a first coupling device used in the fiber-optical sensor shown in FIG. 1, FIGS. 3 and 4 show two further coupling alternatives for the lightwave conductors in the coupling device.

FIG. 2a shows a first embodiment of the coupling device 1. The lightwave conductors 3 and 4 comprise a respective light-conductive core having a round cross-section around which a cladding is provided. The cladding has a refractive index which is lower than that of the light-conductive core, so that the light is guided only within the core. At a given area, where the envelope 5 encloses the lightwave conductors 3 and 4 the cladding has been removed from the lightwave conductors 3 and 4. The envelope 5 consists of a quartz glass capillary with a thickened glass ring 25 in the center of the glass capillary. The lightwave conductors 3 and 4 are clamped in the glass ring 25 under pressure and extend in parallel within the glass ring 25. A pressure or force F applied to the capillary 5 causes the cores of the lightwave conductors 3 and 4 to be pressed together, resulting in a pressure-dependent or force-dependent increase of the optical coupling between them.

Figure 2B:
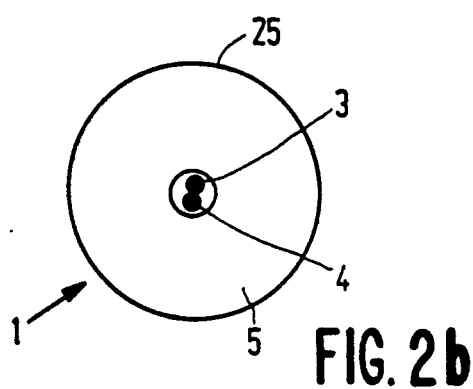
Figure 2C:
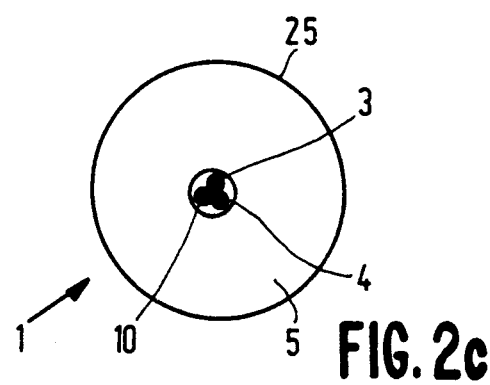

The FIGS. 2b and c are two sectional views of the coupling device 1, taken along the line I-2. FIG. 2b shows two lightwave conductors 3 and 4 which extend through the capillary 5, and FIG. 2c shows three lightwave conductors 3, 4 and 10 which extend through the capillary 5. The additional lightwave conductor 10 ensures that the coupling device 1 has a higher mechanical stability and that the lightwave conductors 3, 4 and 10 cannot slide off one another. Should one of the lightwave conductors 3 and 4 fail due to a fracture, the third lightwave conductor 10 can serve as a substitute.

The coupling device 1 of FIG. 2 can be used either for the measurement of force and pressure or for temperature measurement. When used for temperature measurement, the capillary 5 and the lightwave conductors 3, 4 and 10 must have different thermal coefficients of expansion. On the basis of the different coefficients of thermal expansion of the lightwave conductors 3, 4 and 10 and the capillary 5, the optical coupling between the cores of the lightwave conductors 3, 4 and 10 depends on the temperature, so that a temperature sensor is realized. When the fiber-optical sensor is used for pressure and force measurement, the temperature coefficients of the capillary 5 and the lightwave conductors 3 and 4 must be approximately the same.

The physical quantity Q of the coupling device 1 shown in FIG. 2 can be determined by approximation:

$$Q = LF/(8\pi ER^3),$$

where L is the length of contact between the two lightwave conductors 3 and 4, F is the force, E is the E-module, and R is the radius of the light-conductive cores of the lightwave conductors 3 and 4.

For the manufacture of the coupling device 1 shown in FIG. 2, first the light-conductive cores of the lightwave conductors 3 and 4 are stripped and guided through a quartz glass capillary 5. The capillary 5 is heated to the yield point approximately at its center. Subsequently, it is collapsed until the inner surface of the capillary 5 symmetrically encloses the cores of the lightwave conductors 3 and 4, thus clamping these cores. A glass ring 25 is thus formed at the heated area.

Figure 3:
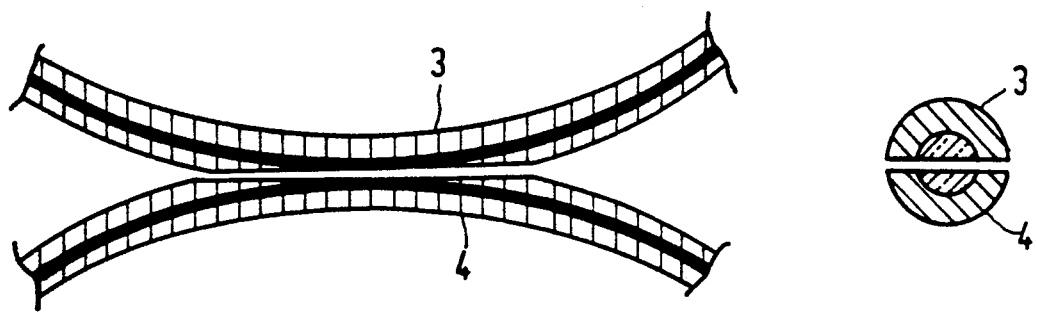

The cladding of the lightwave conductors 3 and 4 extending in the envelope 5 need not be completely removed. In a further version as shown in FIG. 3, the lightwave conductors 3 and 4 are ground down in their axial direction. In the no-load condition, the lightwave conductors 3 and 4 are separated from one another by a small clearance at their area of contact, i.e. the area where contacting between the lightwave conductors 3 and 4 takes place at least in the case of loading. In the case of loading, the ground surfaces of the lightwave conductors 3 and 4 are moved towards one another. The extent of the area of contact between the lightwave conductors 3 and 4 and hence also the degree of optical coupling varies in dependence on the pressure or the force.

Figure 4:
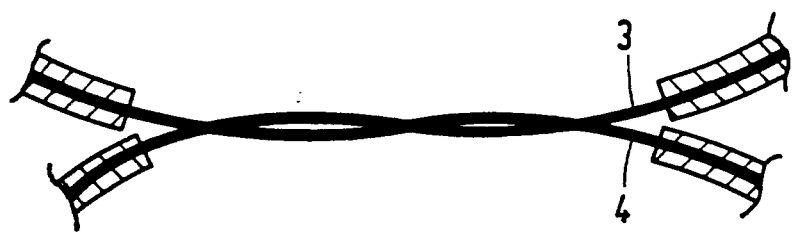

FIG. 4 shows a further possible arrangement of the lightwave conductors 3 and 4 at the area of contact. In this case the cores of the lightwave conductors 3 and 4 are stranded at their area of contact. This arrangement is attractive in that the lightwave conductors 3 and 4 can no longer be shifted with respect to one another in the envelope 5.

Figure 5:
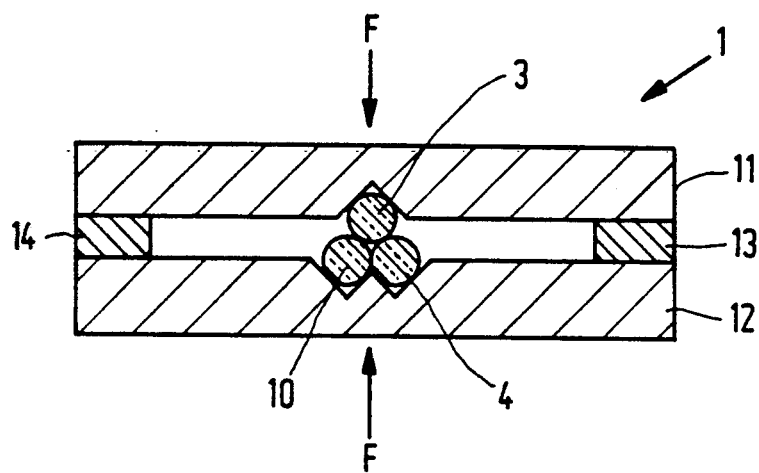
FIGS. 5 and 6 show two further coupling devices.

FIG. 5 shows a further embodiment of a coupling device 1. Two parallel-arranged quartz plates 11 and 12 are provided with V-grooves at their center. The first plate 11 is provided with a V-groove approximately at its center, the apex of the groove facing the outer surface; the other plate 12 comprises two V-grooves whose apices face the outer surface of the plate 12. The V-grooves are arranged so that the lightwave conductors 3, 4 and 10 accommodated thereon are staggered with respect to one another in a pyramid-like fashion. At the edges of the plates 11 and 12 there are provided two connection pieces 13 and 14 which consist of quartz glass foil and which are arranged between the plates 11 and 12.

Figure 6:
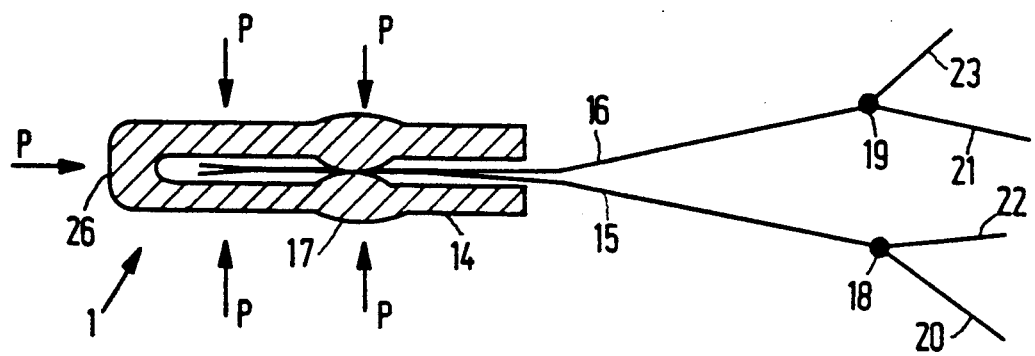

The coupling devices 1 shown in the FIGS. 2 and 5 are suitable for a transmission-type fiber-optical sensor. In a transmission-type fiber-optical sensor the light transmitter device is arranged at one end of the lightwave conductors, the light receiver device being arranged at the other end. FIG. 6 shows a further coupling device 1 for a reflection-type fiber-optical sensor. This coupling device 1 comprises a quartz glass capillary 14, one end 26 of which is sealed. Inside the capillary 14 two lightwave conductors 15 and 16 whose cladding has been removed are provided. At its center the capillary 14 comprises a thickened glass ring 17 which clamps the light-conductive cores of the lightwave conductors 15 and 16 under pressure. On the end faces of the lightwave conductors 15 and 16, located in the glass capillary 14, there are provided reflective layers which reflect the light present in the light-conductive cores of the lightwave conductors 15 and 16. A pressure P applied to the outer wall of the glass capillary causes the glass cores to be pressed further together, and hence introduces a pressuredependent increase of the optical coupling therebetween.

The two lightwave conductors 15 and 16 are connected to respective splitters 18, 19 which also comprise a lightwave conductor which leads to the light transmitter device, and a further lightwave conductor which leads to the light receiver device. The light receiver device and the light transmitter device have been omitted for the sake of clarity. A first transmitted light is thus coupled into the lightwave conductor 15 via a lightwave conductor 20 and the splitter 18, and a second transmitted light is coupled into the light wave conductor 16 via a lightwave conductor 21 and the splitter 19. Reflected light on the one side reaches, via the lightwave conductor 15 and the splitter 18, a lightwave conductor 22 which is connected to the light receiver device. The light receiver device is also connected to a lightwave conductor 23 which receives light from the lightwave conductor 16 via the splitter 19.

In this reflection-type fiber-optical sensor problems may occur at optical interfaces, notably at connector end faces. This is because at these areas often reflections occur which, however, can be avoided by using special connectors having inclined fiber end faces formed by grinding.

The coupling device 1 is suitable not only for the use of lightwave conductors which have been especially prepared, but also for the use of layer-type or strip-type wave conductors as used in integrated optics.

We claim:

1. A fiber-optical sensor, comprising a light transmitter device (6) which couples transmitted light into at least one first lightwave conductor, and also comprising a light receiver device (7) which receives light from the first lightwave conductor and at least one second lightwaveconductor, the lightwave conductors (3, 4) comprising adjacently situated portions between which light can be coupled, and wherein the light transmitter device (6) couples a first transmitted light into the first lightwave conductor (3, 4) and a second transmitted light into the second lightwave conductor (4, 3), the adjacently situated portions (1) of the lightwave conductors (3, 4) being accommodated together in an envelope (5) via which a pressure or force acts on the lightwave conductors (3, 4), portions of the lightwave conductors (3, 4) contacting one another in a light-transferring manner under the influence of said pressure or force.

2. A fiber-optical sensor as claimed in claim 1, wherein the two lightwave conductors (3, 4) accommodated in the envelope comprise a longitudinal ground portion at their area of contact.

3. A fiber-optical sensor as claimed in claim 1, wherein the lightwave conductors (3, 4) are arranged parallel to one another at the area of contact.

4. A fiber-optical sensor as claimed in claim 1, wherein the lightwave conductors (3, 4) are stranded at the area of contact.

5. A fiber-optical sensor as claimed in claim 1 wherein the envelope comprises two mutually parallel plates (11, 12) provided with grooves for the lightwave conductors.

6. A fiber-optical sensor as claimed in claim 1 wherein the envelope (5) comprises a capillary made of quartz glass.

7. A fiber-optical sensor as claimed in wherein for temperature measurement the envelope and the lightwave conductors are made of a material having a different coefficient of thermal expansion.

8. A fiber-optical sensor as claimed in claim 1 wherein for pressure or force measurement the envelope and the lightwave conductors are made of a material having substantially the same coefficient of thermal expansion.

9. A fiber-optical sensor as claimed in claim 1 wherein for the intensity of the received light the light receiver device (7) forms electrical signals from which the physical quantity is determined in an evaluation circuit (8) by forming the ratio of the products $I_{11} I_{22}$ and $I_{21} I_{12}$, where $I_{11}$ is the intensity of the light component originating from the first transmitted light and remaining in the first lightwave conductor (3, 4), $I_{22}$ is the intensity of the light component originating from the second transmitted light and remaining in the second lightwave conductor (4, 3), $I_{21}$ is the intensity of the light component originating from the first transmitted light and coupled into the second lightwave conductor (4, 3), and $I_{12}$ is the intensity of the light component originating from the second transmitted light and coupled into the first lightwave conductor (3, 4).

10. A fiber-optical sensor as claimed in claim 1, wherein at least at their area of contact, the lightwave conductors (3, 4) are constructed as integrated optical layer or strip wave conductors.

* * * * *